US 6,207,325 B1

(12) United States Patent
Matsui et al.

(10) Patent No.: US 6,207,325 B1
(45) Date of Patent: Mar. 27, 2001

(54) LITHIUM-CONTAINING COMPLEX METAL OXIDE, PREPARATION METHODS THEREOF, AND CATHODE ELECTROACTIVE MATERIAL USING THE SAME AND LITHIUM SECONDARY CELLS

(75) Inventors: Yasushi Matsui; Masatoshi Shirao, both of Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/080,346

(22) Filed: May 18, 1998

Related U.S. Application Data
(60) Provisional application No. 60/075,999, filed on Feb. 26, 1998.

(30) Foreign Application Priority Data

| May 19, 1997 | (JP) | ........................................... 9-128930 |
| Feb. 24, 1998 | (JP) | ........................................... 10-042289 |

(51) Int. Cl.[7] .............................. H01M 4/52; H01M 4/58
(52) U.S. Cl. ................. 429/231.1; 429/223; 429/231.2; 423/594; 423/600
(58) Field of Search ............................... 429/223, 231.1, 429/231.2; 423/594, 600, 115, 144

(56) References Cited

U.S. PATENT DOCUMENTS

| 5,626,635 | * | 5/1997 | Yamaura et al. | 29/623.5 |
| 5,631,105 | * | 5/1997 | Hasegawa et al. | 429/194 |
| 5,718,989 | * | 2/1998 | Aoki et al. | 429/218 |
| 5,783,333 | * | 7/1998 | Mayer | 429/223 |
| 5,795,558 | * | 8/1998 | Aoki et al. | 423/594 |

FOREIGN PATENT DOCUMENTS

| 63-121258 | 5/1988 | (JP) . |
| 5242891 | 9/1993 | (JP) . |
| 07 192721 | * 7/1995 | (JP) .............................. H01M/4/02 |
| 08213015 | 8/1996 | (JP) . |
| 9231973 | 9/1997 | (JP) . |
| 10027611 | 1/1998 | (JP) . |

OTHER PUBLICATIONS

Arai et al., "A Study $LiNi_{1-x}M_xO_2$ as Cathode Materials for Lithium Batteries", NTT Inter–disciplinary Research Laboratories (Tokai, Naka, Ibaraki, 319–11, Japan), pp. 98–106 (Abstract), Feb. 18, 1994.

Ebner et al., "The $LiNiO_2$/Carbon Lithium–Ion Battery", Solid State Ionics 69, 1994, pp. 238–256, (no month).

Ohzuku et al., Electrochemistry and Structural Chemistry of $LiNiO_2$ (R3m) for 4 Volt Secondary Lithium Cells, J. Electrochem. Soc., vol. 140, No. 7, Jul. 1993, pp. 1862–1870.

Ohzuku et al., Synthesis and Characterization of $LiAl_{1/4}Ni_{3/4}O_2$ (R3m) for Lithium–Ion (Shuttlecock) Batteries, J. Electrochem. Soc., vol. 142, No. 12, Dec. 1995, pp. 4033–4039.

Zhong et al., Crystal Structures and Electrochemical Properties of $LiAl_yNi_{1-y}O_2$ Solid Solution, Journal of Power Sources 54, 1998, pp. 221–223.

* cited by examiner

*Primary Examiner*—Carol Chaney
(74) *Attorney, Agent, or Firm*—Sughrue, Mion, Zinn, Macpeak & Seas, PLLC

(57) ABSTRACT

A lithium-containing complex metal oxide having a crystal structure of $\alpha$-$NaFeO_2$ type and represented by a general formula:

$$Li_aNi_xCo_yAl_zO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$, and further wherein a separation between a peak position of (018) face and a peak position of (110) face in the powder X-ray diffraction pattern of said metal oxide using $CuK\alpha$-ray is in the range of from 0.520 to 0.700° as expressed in terms of $\Delta 2\theta((110)-(018))$.

10 Claims, 2 Drawing Sheets

Fig.1

LITHIUM-CONTAINING COMPLEX METAL OXIDE, PREPARATION METHODS THEREOF, AND CATHODE ELECTROACTIVE MATERIAL USING THE SAME AND LITHIUM SECONDARY CELLS

CROSS REFERENCE TO RELATED APPLICATIONS

This application is an application filed under 35 U.S.C. §111(a) claiming benefit pursuant to 35 U.S.C. §119(e)(1) of the filing date of the Provisional Application 60/075,999, filed Feb. 26, 1998, pursuant to 35 U.S.C. §111(b).

BACKGROUND OF THE INVENTION

1. Field of the Invention

This invention relates to a lithium-containing complex metal oxide suited to a cathode electroactive material for lithium secondary cells, a preparation method thereof, a cathode electroactive material using the same, and a lithium secondary cell. More specifically, it relates to a lithium nickelate-based complex metal oxide which has excellent thermal stability and can be used as a cathode electroactive material in a lithium secondary cell (battery) wherein metal lithium or a lithium-carbon (lithium-graphite) intercalation compound is used as an anode electroactive material, thus making the cell has a high capacity and good cycle characteristics.

2. Related Background Art

The non-aqueous secondary cell disposed lithium or lithium compound as an anode has been expected to the cell having a high voltage and high energy density, and therefore, many studies have been proceeded. Widely known cathode electroactive materials for the secondary batteries with non-aqueous electrolyte solutions include the complex metal oxide comprising of lithium and other metal or metals such as lithium cobalt oxide, lithium nickel oxide, and lithium manganese oxide; metal oxides such as manganese dioxide, titanium disulfide, molybdenum disulfide, vanadium pentaoxide, and niobium pentaoxide; and chalcogens. These oxides and compounds have layer or tunnel crystal structures and are capable of repeating the reversible release and intercalation of lithium ions on the charge/discharge, respectively. Especially, active studies are being made on lithium cobalt oxide, lithium nickel oxide, and lithium manganese oxide for their use in the cathode electroactive material for lithium secondary cells with non-aqueous electrolyte solutions as four-volt (V) type cell. Lithium cobalt oxide, which is relatively easy to prepare, has already been put into practical use.

However, cobalt is a very expensive metal and also a strategic material, and the places of its origin are localized within certain regions; thus, there are problems such as the troubled supply due to changes in political situations or rising in the price. On the other hand, nickel and manganese are relatively inexpensive metals and their stable supply is possible. Lithium manganese oxide has a smaller capacity compared with lithium cobalt oxide and lithium nickel oxide, and has problems in cycle characteristics. Lithium nickel oxide has also some problems in its cycle characteristics. $LiNiO_2$ results a change in its crystal structure from hexagonal to monoclinic, as it releases Li on the charge. This is believed to cause deterioration of the cycle characteristics. It has been found as a countermeasure to the deterioration that, if a part of the Ni in $LiNiO_2$ is substituted with Co, there will be no change from hexagonal to monoclinic and thus the cycle characteristics will be improved. See, T. Ohzuka et al., J. Electrochem. Soc., 140, 1862 (1993) and S. Arai, S. Okada, H. Ohtsuka, and J. Yamamoto, Battery Technology (Denchi Gijyutsu), 7, 98 (1995).

When $LiNiO_2$ is released Li through charging, $NiO_2$ is formed. $NiO_2$ is a very unstable compound, which generates heat while releasing oxygen. Accordingly, it is strongly desired that the thermal stability of $LiNiO_2$ is improved.

It has been found that if a part of the Ni in $LiNiO_2$ is substituted with Al, there will be a great improvement in its thermal stability. In this case, the charge capacity, however, lowers greatly. See, T. Ohzuka et al., J. Electrochem. Soc., 142, 4033 (1995).

Japanese Unexamined Patent Publication Sho 63-121,258 (1988) suggests a method to improve overpotential characteristics by substituting $LiCoO_2$ with a variety of other metals. Also, in Japanese Unexamined Patent Publication Hei 5-242,891 (1993), it is suggested that if $LiNi_xCo_yO_2$ is further substituted with a variety of other metals, its discharge capacity will increase and that when Fe or Cu exists their thermal stability will be improved.

O. Zhong et al. have studied the synthesis and electrochemistry of $LiAl_yNi_{1-y}O_2$. See, O. Zhong and Ulchi von Sacken, J. Power Sources, 54, 221 (1995). Synthesis of $LiAl_yNi_{1-y}O_2$ was first attempted with a mixture of LiOH, NiO, and $Al_2O_3$ (or Al $(OH)_3$), but the synthesis of a single-phase $LiAl_yNi_{1-y}O_2$ was unsuccessful, as the product was contaminated with $Al_2O_3$ as an impurity. Thus, they changed the Al source to a metal Al powder (300 mesh) and, for the first time, succeeded in synthesizing the single-phase product. Nevertheless, its discharge capacity was as small as 104–148 mAh/g.

SUMMARY OF THE INVENTION

This invention enables the obtaining of a lithium secondary cell that has a large discharge capacity and good cycle characteristics in addition to improved Coulomb efficiency at the first cycle of the charge/discharge. Moreover, an object of the invention is to provide a lithium-containing complex metal oxide having excellent thermal stability and suited to a cathode electroactive material (positive active material) for a lithium secondary cell.

Also, another object of the invention is to provide a method for preparing the above-mentioned lithium-containing complex metal oxide with good efficiency and relibility.

Further, another object of the invention is to provide a lithium secondary cell that is excellent in the cycle characteristics, the discharge capacity, and thermal stability and is improvided with respect to the Coulomb efficiency at the first cycle of the charge/discharge, as well as to provide a cathode electroactive material thereof.

As a result of intensive efforts to solve the above-mentioned problems, the present inventors discorvered that by substituting a part of the Ni $LiNiO_2$ with Co and Al, a lithium secondary cell with a large discharge capacity and good cycle characteristics can be obtained and further that a lithium-containing complex metal oxide, which serves as the cathode electroactive material with excellent thermal stability, can also be obtained. Furthermore, the present inventors discovered that in the preparation of this lithium-containing complex metal oxide, a method to blend (or mix) the raw material compounds containing Li, Ni, Co, and Al had an influence on characteristics of the products, particularly the thermal stability and the Coulomb efficiency at the first cycle of the charge/discharge, thus completing this invention.

The lithium-containing complex metal oxide of this invention is a lithium-containing complex metal oxide having a crystal structure of the α-NaFeO$_2$ type and represented by the general formula:

$$Li_aNi_XCo_YAl_ZO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$, and further wherein a separation between a peak position of (018) face and a peak position of (110) face in the powder X-ray diffraction pattern of said metal oxide using CuKα-ray is in the range of from 0.520 to 0.700° as expressed in terms of $\Delta 2\theta((110)-(018))$.

The lithium-containing complex metal oxide of the invention as described above, preferably, has a peak height ratio of 0.30 or less. The peak height ratio is calculated based on the following equation:

peak height ratio=peak height (μV)/((peak temperature)–(beginning temperature of the peak)), in the exothermic peak curve by DTA measurement.

Also, the cathode electroactive material for a lithium secondary battery according to this invention contains a lithium-containing complex metal oxide of the invention as described above.

Further, the lithium secondary battery of the invention is a lithium secondary cell comprising:
a positive electrode plate;
a positive electrode electrically connected to the positive electrode plate;
a negative electrode plate;
a negative electrode electrically connected to the negative electrode plate; and
a separator positioned between the positive electrode and the negative electrode, said separator being impregnated with an electrolyte solution, wherein the positive electrode contains the lithium-containing complex metal oxide of the invention as a cathode electroactive material.

According to the invention, the first method for the preparation of a lithium-containing complex metal oxide is a method for preparing a lithium-containing complex metal oxide represented by the general formula:

$$Li_aNi_XCo_YAl_ZO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$,
said method comprising the steps of:
neutralizing a mixed aqueous solution containing a Ni compound, a Co compound, and an Al compound to obtain a coprecipitation product;
washing and drying the coprecipitation product, and dry blending the coprecipitation product with at least one lithium compound selected from the group consisting of LiOH, Li$_2$O, and Li$_2$CO$_3$ to obtain a blend; and
burning the blend in an oxygen-containing stream to obtain said lithium-containing complex metal oxide.

It is preferred that in the first preparation method of the invention as described above, the step of obtaining the coprecipitation product comprises: a step of obtaining a mixed aqueous solution containing a Ni compound and a Co compound; and a step of neutralizing the mixed aqueous solution by addition of an aqueous solution of an alkali metal aluminate thereto to obtain the coprecipitation product. In this case, the alkali metal aluminate is preferably at least one salt selected from the group consisting of lithium aluminate, sodium aluminate, and potassium aluminate. Also, it is preferred that the Ni compound is a nickel halide, nickel sulfate or nickel nitrate, and the Co compound is a cobalt halide, cobalt sulfate or cobalt nitrate.

Further, it is preferred that in the burning step according to the first preparation method of the invention, an additional lithium compound is allowed to coexist in a state such that said lithium compound contacts the blend only through a gaseous phase.

According to the invention, the second method for the preparation of a lithium-containing complex metal oxide is a method for preparing a lithium-containing complex metal oxide represented by the general formula:

$$Li_aNi_XCO_YAl_ZO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$,
said method comprising the steps of:
blending at least one compound selected from the group consisting of lithium hydroxide and lithium oxide, at least one compound selected from the group consisting of a nickel hydroxide and a nickel oxide, at least one compound selected from the group consisting of a cobalt hydroxide and a cobalt oxide, at least one compound selected from the group consisting of aluminum hydroxide and aluminum oxide, and a solvent to prepare slurry containing the foregoing compounds; and
filtering blended solids from the slurry, drying the blended solids, and burning the blended solids in an oxygen-containing stream to obtain said lithium-containing complex metal oxide.

It is preferred that in the second preparation method of the invention as described above, the solvent is at least one member selected from the group consisting of an alcohol, a ketone, and an ether.

Also, it is preferred that in the burning step according to the second preparation method of the invention, an additional lithium compound is allowed to coexist in a state such that said lithium compound contacts the blended solids only through a gaseous phase.

According to the invention, the third method for the preparation of a lithium-containing complex metal oxide is a method for preparing a lithium-containing complex metal oxide represented by the general formula:

$$Li_aNi_XCo_YAl_ZO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$,
said method comprising the steps of:
blending at least one compound selected from the group consisting of a nickel hydroxide and a nickel oxide, at least one compound selected from the group consisting of a cobalt hydroxide and a cobalt oxide, at least one compound selected from the group consisting of aluminum hydroxide and aluminum oxide, and water as solvent to prepare slurry containing the foregoing compounds;
filtering blended solids from the slurry, drying the blended solids, and dry blending the blended solids with at least one lithium compound selected from the group consisting of LiOH, Li$_2$O and Li$_2$CO$_3$ to obtain a blend; and burning the blend in an oxygen-containing stream to obtain said lithium-containing complex metal oxide.

It is preferred that in the burning step according to the third preparation method of the invention, an additional lithium compound is allowed to coexist in a state such that said lithium compound contacts the blend only through a gaseous phase.

DESCRIPTION OF THE PREFERRED EMBODIMENTS

This invention will be hereinbelow explained in detail.

The lithium-containing complex metal oxide of this invention is a lithium-containing complex metal oxide having a crystal structure of the $\alpha$-NaFeO$_2$ type and represented by the general formula:

$$Li_aNi_XCo_YAl_ZO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$. When the amount Y of Co substitution in this Co and Al-substituted LiNiO$_2$ crystal is less than 0.05, the cycle characteristics deteriorate; and the discharge capacities lower when it exceeds 0.20, both of which are not preferable. When the amount Z of Al substitution exceeds 0.10, the thermal stability greatly improves and thus it is preferably equal to or more than 0.11; however, the discharge capacities lower when the amount Z exceeds 0.25, which is not preferable. The ratio of the Li atom to the total amount (X+Y+Z) of the metal atoms (Ni, Co, and Al) other than Li is preferably 1.0, but the values for the "a" and (X+Y+Z) may well be in the above-mentioned range.

Under the conditions of measurement using CuKα-ray as described below, the powder X-ray diffraction pattern of the lithium-containing complex metal oxide (Li$_a$Ni$_X$Co$_Y$Al$_Z$O$_2$) according to the invention shows that the (018) face peak and the (110) peak are completely separated and that $\alpha 2\theta$ ((110)–(018)), which is a differential $2\theta$ between the two peaks, is from 0.520 to 0.700°. The present inventors discovered that this condition was the requirement for cathode electroactive materials having good thermal stability and was indispensable to the lithium-containing complex metal oxides of the invention. That is, sufficient thermal stability can not be achieved when $\Delta 2\theta$ is less than 0.520°; on the other hand, when $\Delta 2\theta$ exceeds 0.700°, the thermal stability becomes better. Further, the $\Delta 2\theta$ changes with the amount of Co, so it will not exceed 0.700° even if a very pure crystal is generated when the amount of Co is in a range of $5\% \leq Co \leq 20\%$. The $\Delta 2\theta$ exceeds 0.700° in some cases when a very pure crystal is generated with a Co amount of 20% or more, but the discharge capacity thereof is small. Being in the above-mentioned range, the $\Delta 2\theta$ implies that the complete blending (or mixing) of the raw materials has been done to preferably cause the mixing of the constituent metals at their atomic levels and very clean (homogeneous) solid solution crystals are formed.

The conditions for the X-ray diffraction measurement are as follows: slits (divergent slit: 1/2°; scattering slit: 1/2°; receiving slit: 0.3 mm); scan speed: 1.50°/min; scan step: 0.02°; and output: 50 KV/180 mA.

The lithium-containing complex metal oxide of this invention has a peak height ratio preferably of 0.30 or less, the peak height being calculated based on the following equation:

peak height ratio=peak height ($\mu$V)/((peak temperature)–(beginning temperature of the peak)), in an exothermic peak curve by the DTA measurement.

The peak height ratio (thermal stability) was evaluated following the test method as will be described below. A cathode electroactive material (300 mg) is mold into a pellet having 13 mmφ (molding pressure: 200 kg/cm$^2$). This pellet is used as a positive electrode (cathode), a lithium foil as a negative electrode (anode), and 1 M LiPF$_6$/EC (ethylenecarbonate)+DMC (dimethylcarbonate) (1:2) as an electrolyte solution; thus, a cell is fabricated. The cell container is made of metal and can be disassembled. A lithium foil, a separator, unwoven cloths, and a positive electrode are overlaid on the top of each other to form a laminate. After sufficiently impregnating the unwoven cloths with the electrolyte solution, the laminate is pressed within the cell container by a spring to form a cell. The cell is fully charged at a current density of 0.7 mA/cm$^2$ and a voltage of 4.2 V. After the full charge, the cell is disassembled in a glove box, the positive electrode is washed with DMC, the electrolyte solution is removed and the electrode is dried. Then, 20±1 mg of this positive electrode is included and sealed into an aluminum cell for the DTA (differential thermal analysis). DTA is performed at a programming rate of 10° C./min in a stream of nitrogen to determine the exothermic peak temperature, and the peak height ratio is calculated based on the following equation:

peak height ratio=peak height ($\mu$V)/((peak temperature)–(beginning temperature of the peak)).

The smaller the peak height ratios are, the better the thermal stability becomes. Therefore, the peak height ratios exceeding 0.30 in the lithium-containing complex metal oxides of this invention are not preferable, since the thermal stability of the resulting cathode electroactive materials tends to deteriorate.

As described above, the methods to blend raw material compounds containing Li, Ni, Co, and Al have an influence on characteristics of the products, particularly the thermal stability and the Coulomb efficiency at the first cycle of the charge/discharge. The present inventors, have for the first time, discovered this fact. So the conventional, improvements on the thermal stability or the like have not been intended from such a standpoint. Thus, the lithium-containing complex metal oxides of this invention having the above-mentioned compositions (Li$_a$Ni$_X$Co$_Y$Al$_Z$O$_2$) and $\Delta 2\theta$ ((110)–(018)) values of from 0.520 to 0.700° have not, hitherto, been obtained. That is, the first through the third preparation methods according to this invention have realized the obtaining of the lithium-containing complex metal oxides of the invention.

To begin with, the first method for preparation of the lithium-containing complex metal oxides of this invention will be explained. The first preparation method is that which utilizes the so-called coprecipitation mixing. A mixed aqueous solution of the compounds containing Ni, Co, and Al is subjected to coprecipitation/neutralization with alkali (such as NaOH, KOH, and LiOH) and/or acid (such as HCl). After washing and drying, the coprecipitation product is dry blended with at least one lithium compound selected from the group consisting of LiOH, Li$_2$O and Li$_2$CO$_3$.

Nickel chloride, nickel sulfate, nickel nitrate, etc are named as the Ni compound; cobalt chloride, cobalt sulfate, cobalt nitrate, etc are named as the Co compound; and alkali metal aluminate such as sodium aluminate, potassium aluminate, lithium aluminate, etc are named as the Al compound, respectively. Concentrations of the Ni, Co, and Al compounds in the above-mentioned mixed aqueous solution are not particularly limited, but the total concentration of these compounds is preferably in a range from about 0.5 to about 2.0 mol/L. Further, the initial and final pH's of the mixed aqueous solution are preferably from about 3 to about 4 and on the order of from about 12 to about 13, respectively. The pH of the solution when the coprecipitation products are to be precipitated should preferably be maintained in a neutral pH region from about 6.8 to about 7.8. Furthermore, the methods to wash and dry the coprecipitation products are not particularly limited and standard techniques are employed as appropriate.

Plural kinds of the aforementioned lithium compounds may be used. For the dry blending method, blending with a ball mill, blending with a planet mill and the like are effective. According to the first preparation method of this invention, Ni, Co, and Al metal atoms are mixed almost homogeneously at their atomic levels in the coprecipitation product containing these metals; therefore, blends in which these metal atoms are homogeneously mixed to a great extent can be obtained by dry blending the coprecipitation products with the lithium compounds. Further, the proportion of the Ni, Co, Al, and Li compounds is chosen so that the ratio of these metal atoms may be within the range of the ratio of the respective metal atoms in the lithium-containing complex metal oxides of this invention.

For the Al compound, an alkali metal aluminate is preferably used in the first preparation method of this invention. Preferably, in this case an aqueous solution of the alkali metal aluminate is added to the mixed solution of Ni and Co compounds to cause neutralization/coprecipitation. Because the alkali metal aluminate directly reacts with only such salts as nickel chloride ($NiCl_2$) and cobalt chloride ($CoCl_2$), mixing at an atomic level is more effected with respect to Al, forming a very clean solid solution.

Thus, the halides (for example, chlorides) of nickel and cobalt are preferably used as the Ni and Co compounds when an alkali metal aluminate is to be used. Concentrations of the Ni and Co compounds in the above-mentioned mixed aqueous solution are not particularly limited, but the total concentration of these compounds is preferably in a range from about 0.5 to about 2.0 mol/L. Further, the alkali metal aluminate is preferably at least one salt selected from the group consisting of lithium aluminate, sodium aluminate, and potassium aluminate. The initial pH of the mixed aqueous solution should preferably be maintained in a neutral pH region from about 6.8 to about 7.8.

In the first preparation method of this invention, the aforementioned blend is next burnt in an oxygen-containing stream to obtain the lithium-containing complex metal oxide of the invention. It is preferred that burning of the blend, which is in a powder form as is or has been molded into pellets, is carried out in an oxygen or air stream (dehumidified and treated to remove carbon dioxide gas) at a temperature of from 700 to 850° (more preferably at from 700 to 800°, most preferably at from 740 to 780°) over 10 h (more preferably between 20–24 h). At too high reaction temperatures, metals such as Ni mix into the Li layer to cause disorder. On the other hand, at too low reaction temperatures the dehydration reaction has a tendency not to sufficiently progress. Also, with too short reaction times, the constituent metal atoms do not tend to undergo sufficient migration. Further, it is preferred to immediately remove the water formed by the dehydration reaction during the burning. The flow rate of the oxygen-containing stream is preferably in a range from about 10 to about 200 L/kg (raw material)·min.

During the burning it is preferred that an additional lithium compound is allowed to coexist in a state such that the lithium compound contacts the aforementioned blend present within a burning system only through a gaseous phase, for example, the lithium compound is included in a container, which is an open system within the burning system, so as not to directly contact the blend and thus, is allowed to coexist within the burning system. This enables the evaporation of lithium during burning to be compensated. LiOH or $Li_2O$ is preferred as the coexisting lithium compound. The desired lithium-containing complex metal oxides may be obtained by removing the residual coexisting lithium compounds after burning.

Next, the second method for preparation of the lithium-containing complex metal oxides of this invention will be explained. The second preparation method is that which utilizes the so-called slurry blending and it prepares slurry of hydroxides and/or oxides of the raw material metals (Li, Ni, Co, and Al) as described above to effect mixing. Since the optimum concentration of the slurry varies with grain sizes of the powders to be mixed and others, it is appropriately chosen so as to provide a viscosity that does not cause phase separation upon completion of the blending, and a concentration of from 20 to 45 weight % is preferable. The blending methods preferably employ a ball mill for blending, and, in this case, the preferred blending conditions are as follows:

Ball diameter: 5–30 mm;
Ball amount: 10–50 volume % of container;
Revolution: 5–130 rpm;
Blending time: 10–24 hr.

The solvent for the slurry is preferably at least one solvent selected from the group consisting of an alcohol, a ketone, and an ether.

Furthermore, the use of water as the solvent requires the third method for the preparation of lithium-containing complex metal oxides of this invention. Namely, hydroxides and/or oxides of metals (Ni, Co, and Al) other than Li are blended in a slurry form. The blended solids in the slurry are filtrated and dried and then, dry blended with at least one lithium compound selected from the group consisting of LiOH, $Li_2O$, and $Li_2O$. Lithium compounds dissolve when they are blended in aqueous slurry.

According to the second preparation method of this invention, by blending Li, Ni, Co, and Al in a slurry form, the blended solids wherein these metal atoms are mixed almost homogeneously at their atomic levels can be obtained. Also, according to the third preparation method of this invention, Ni, Co, and Al metal atoms are mixed almost homogeneously at their atomic levels by being blended in a slurry form; therefore, the blends in which these metal atoms are homogeneously mixed to a great extent can be obtained by dry blending the blended solids in the slurry with the lithium compounds. The proportion of the hydroxides and/or oxides of Ni, Co, Al, and Li (Li compound in the third method of preparation) is chosen so that the ratio of these metal atoms may be within the range of the ratio of the respective metal atoms as described above in the lithium-containing complex metal oxides of this invention.

In the second preparation method of this invention, after being filtered from the slurry and dried, the blended solids are burnt in an oxygen-containing stream similarly to the first preparation method to obtain the lithium-containing complex metal oxides of this invention. Further, the methods to filter and dry the blended solids are not particularly limited and standard techniques are employed as appropriate.

In the third preparation method of this invention, the aforementioned blend is burnt in an oxygen-containing stream similarly to the first preparation method to obtain the lithium-containing complex metal oxides of the invention.

Next, the cathode electroactive materials for lithium secondary cells and the lithium secondary cells according to this invention will be explained. The cathode electroactive materials of this invention contain the lithium-containing complex metal oxides of this invention as described above. The lithium secondary cells of this invention are characterized in that the lithium-containing complex metal oxides of this invention are used in their positive electrodes as the cathode electroactive materials, while a preparation method thereof may be a method similar to a conventional one. That is, in a method conventionally used for preparing lithium secondary cells, cathode electroactive materials to be used may be replaced with the lithium-containing complex metal oxides of this invention.

Figure 1:
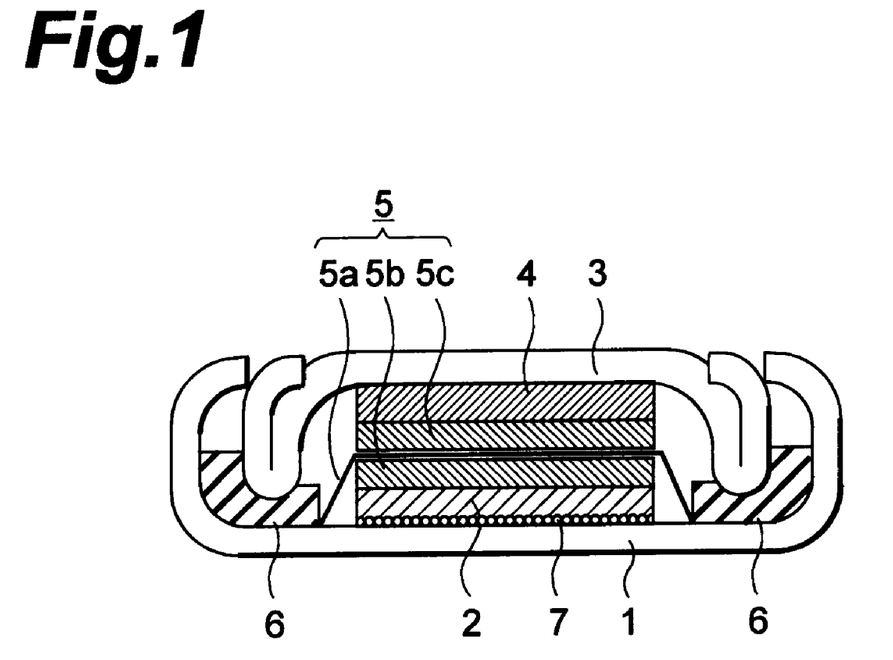
FIG. 1 is a schematic section view illustrating a preferred embodiment of the lithium secondary cells according to this invention.

FIG. 1 illustrates a preferred embodiment of the lithium secondary cells according to this invention. However, the lithium secondary cells of this invention are not limited to the embodiment shown in the Figure.

The lithium secondary cell shown in FIG. 1 is a lithium secondary cell provided with a positive electrode plate 1, a positive electrode 2 electrically connected to the positive electrode plate 1, a negative electrode plate 3, a negative electrode 4 electrically connected to the negative electrode plate 3, and a separator 5 positioned between the positive electrode 2 and the negative electrode 4, and impregnated with an electrolyte solution.

Insofar as the positive electrode 2 contains a lithium-containing complex metal oxide of this invention as the cathode electroactive material, the other constituents and their forms of the positive electrode 2 are not limited. The cathode electroactive materials are blended with conductive agents and binding agents, and molded into desired shapes to form preferable positive electrodes: the conductive agents, for example, include a carbon, a metal powder, and a conductive metal oxide powder; and the binding agents, for example, includes polyfluoroethylene, polyacrylonitrile, polymethacrylonitrile, polyfluorovinylidene, polychloroprene, and polychlorovinylidene. The positive electrode 2 also may further contain other additives such as a thickener, dispersant, and filler. The content of the cathode electroactive material is preferably of 80 weight % or greater.

The negative electrode 4 may be an ordinary negative electrode for lithium secondary cells and, for example, employs lithium, a lithium alloy, and a lithium-containing oxide. The separator 5 also is not particularly limited. In the separator 5 shown in FIG. 1, unwoven cloths 5b and 5c are overlaid on both sides of a porous synthetic resin film 5a. Further, the electrolyte solutions are not particularly limited and ordinary electrolytes for lithium secondary cells may be dissolved in organic solvents, which are named as representatives: the electrolytes, for example, include $LiPF_6$, $LiClO_4$, $LiBF_4$, $LiAsF_6$, $CF_3SO_3Li$, and LiI; and the solvents, for example, include a carbonate, an ether, a ketone, a lactone, a nitrile, an ester, a chlorinated hydrocarbon, and a sulfolane compound.

Both of the positive electrode plate 1 and negative electrode plate 3 are not particularly limited. Representatives of a cell container composed of the positive electrode plate 1 and the negative electrode 3 are a coin type (shown in FIG. 1), a square-shaped type, a cylindrical type, a button-shaped type, etc. Additionally, in the lithium secondary cell shown in FIG. 1, a peripheral portion of the positive electrode plate 1 and that of the negative electrode plate 3 are insulated by a pair of insulating packing 6 or the like and a collector 7 is positioned between the positive electrode plate 1 and the positive electrode 2.

EXAMPLES

This invention will be hereinbelow illustrated by way of examples; however, it is in no way limited to these examples. Also, the fabrication and disassembling of the cells shown in the following examples were conducted in glove boxes under an argon atmosphere.

Example 1

Figure 2:
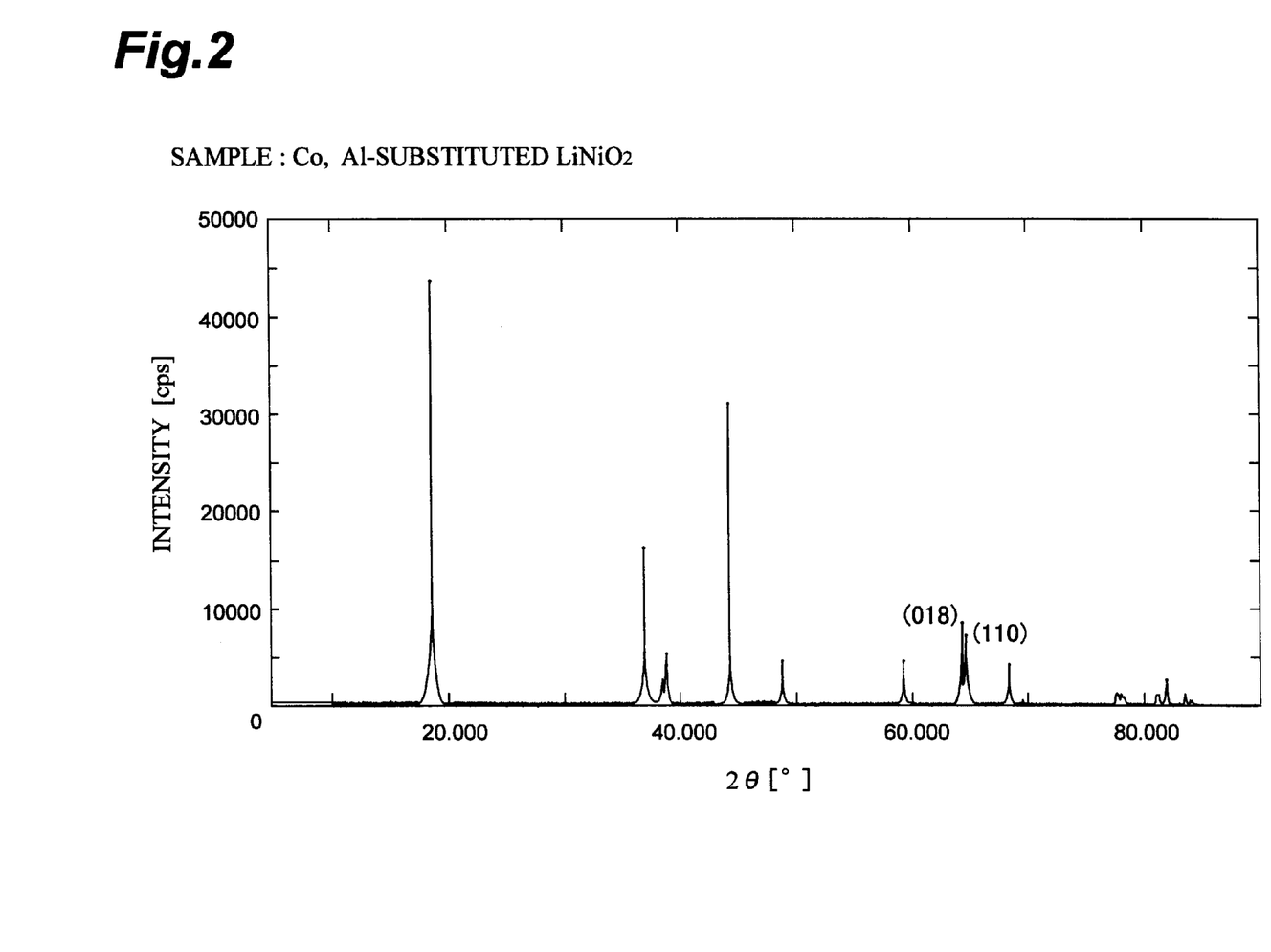
FIG. 2 is an X-ray diffraction pattern of a preferred embodiment (Example 1) of the lithium-containing complex metal oxides according to the invention.

Nickel chloride hydrate ($NiCl_2.6H_2O$), 197.3 g (0.83 mol) and cobalt chloride hydrate ($CoCl_2.6H_2O$), 11.9 g (0.05 mol), were dissolved in 2000 ml of ion-exchanged water to prepare a mixed aqueous solution containing Ni and Co. Subsequently, after 70.4 g (1.76 mol) of sodium hydroxide (NaOH) was dissolved in 400 ml of ion-exchanged water, 3.24 g (0.12 mol) of aluminum foil was dissolved into this solution to prepare an aqueous sodium aluminate solution. The mixed solution of Ni and Co compounds was neutralized with this sodium aluminate. The resulting bluish green precipitates were filtrated, washed sufficiently, and dried. After drying, 24 g (1.0 mol) of lithium hydroxide (LiOH) was added and blending under stirring was done in a ball mill for 24 h. A portion (40 g) of this blend was put into a porcelain container, set in a tubular electric furnace having an inner volume of 2.8 L, and burnt under heating in a stream of oxygen (1000 ml/min) at 750° C. for 20 h. Thereafter, the container was cooled to the room temperature, the product (32 g) was taken out, and subjected to the measurement of its powder X-ray diffraction (CuK α-ray). The result obtained is shown in FIG. 2. The X-ray diffraction pattern displayed the typical crystal structure of an $\alpha$-$NaFeO_2$ type. The (018) and (110) faces were also nicely separated and $\Delta 2\theta$ was equal to 0.560°. The result of ICP analysis of the product proved that the product was $LiNi_{0.83}Co_{0.05}Al_{0.12}O_2$.

This product was used as a cathode electroactive material to prepare a positive electrode 2 shown in FIG. 1. Namely, the electroactive material, ketchen black (which served as a conducting agent), and polyfluoroethylene resin as a binding agent were blended to give a weight ratio of 8:1:1 (the total weight of 1.25 g). It was kneaded enough while being allowed to let the resin swollen by addition of toluene (3.00 g). Further, kneading continued as the toluene was allowed to evaporate. The kneading product was press-molded onto an expanded mesh 7 made of stainless steel (100 $\mu$m in thickness) to form a sheet. The press-molding was done at 90° C. under 200 kg/cm$^2$, while repeating degassing a few times. A disk having a diameter of 16 mm was punched out from this sheet (310 $\mu$m in thickness) and was made into the positive electrode 2 by degassing in vacuo at 90° C. for 15 h.

This positive electrode 2 was used to fabricate a coin cell having 20 mm $\phi$. Specifically, the positive electrode 2 was placed in a coin container 1, and on its top an unwoven cloth made of polypropylene 5b having 16 mm $\phi$(100 $\mu$m in thickness), a separator made of porous polypropylene 5a having 19 mm $\phi$(25 $\mu$m in thickness), and an unwoven cloth made of polypropylene 5c having 16 mm $\phi$(100 $\mu$m in thickness) were laminated. A negative electrode 4 (lithium foil having a thickness of 500 μm and a diameter of 19 mm φ) was covered on the top. After an electrolyte solution (1 M LiPF$_6$/EC+DMC (1:2)) was introduced to fully let the unwoven cloths soak, a pair of Teflon packing 6 was placed, and an upper lid 3 was put, thus forming a cell after caulking.

This cell was subjected to a voltage-controlled charge/discharge test between 2.5 V and 4.3 V at a charge/discharge current density of 0.3 mA/cm$^2$ at 20° C. Then, a discharge capacity at the second cycle was taken as the discharge capacity. The cycle characteristics were evaluated in terms of a value that was obtained by dividing the discharge capacity at the 30th cycle by that at the second cycle, that is, on the capacity retention rate. A peak height ratio was also computed according to the method as described above and the thermal stability of the lithium-containing complex metal oxide for the cathode electroactive material was evaluated. Table 1 below shows results on the cell characteristics, thermal stability, and the X-ray diffraction of the complex metal oxide crystal. Here, the discharge capacity represents an electric capacity at the time of discharge as converted to a value per one gram of the electroactive material.

TABLE 1

Evaluation of Characteristics of Cathode Electroactive Material

| Cell characteristics | Discharge capacity | 185 mAh/g |
| --- | --- | --- |
| | Coulomb efficiency at the first cycle | 91.3% |
| | Capacity retention rate | 98% |
| Properties of the electroactive material | Peak height ratio | 0.207 |
| | Δ2Θ((110)face-(018)face) | 0.560° |

Example 2

Methyl ethyl ketone (390 g) was added to lithium hydroxide (24 g, 1 mol), nickel hydroxide (74.2 g, 0.8 mol), cobalt hydroxide (4.65 g, 0.05 mol), and aluminum hydroxide (11.7 g, 0.15 mol) to make slurry, and it was blended under stirring in a ball mill for 24 h. The blended solids in the slurry were filtrated and dried. Subsequently, a portion (40 g) of this blend was put into a first porcelain container, and also lithium hydroxide (5 g, 0.20 mol) was put into a second container. Both containers were set in a tubular electric furnace having an inner volume of 2.8 L and burning under heating was performed at 780° C. for 24 h in a stream of oxygen (700 mL/min). Thereafter, the containers were cooled to room the temperature and then the second container in which residual lithium compounds were present was removed out. The product (32 g) was taken out from the first container, and subjected to the measurement of its powder X-ray diffraction. Similarly to Example 1, the evaluation of the cell characteristics and thermal stability of the material was carried out. These results are shown in Table 2. The result of the ICP analysis proved that the composition of product was LiNi$_{0.8}$Co$_{0.05}$Al$_{0.15}$O$_2$.

TABLE 2

Evaluation of Characteristics of Cathode Electroactive Material

| Cell characteristics | Discharge capacity | 180 mAh/g |
| --- | --- | --- |
| | Coulomb efficiency at the first cycle | 86.5% |
| | Capacity retention rate | 98% |

TABLE 2-continued

Evaluation of Characteristics of Cathode Electroactive Material

| Properties of the electroactive material | Peak height ratio | 0.185 |
| --- | --- | --- |
| | Δ2Θ((110)face-(018)face) | 0.560° |

Example 3

Ion-exchanged water (300 g) was added to nickel hydroxide (76 g, 0.82 mol), cobalt hydroxide (6.5 g, 0.07 mol), and aluminum oxide (5.6 g, 0.055 mol), and it was blended under stirring in a ball mill for 24 h. The blended solids in slurry were filtrated and dried. Subsequently, lithium hydroxide (24 g, 1 mol) was added and it was further blended under stirring in the ball mill for 24 h. A portion (40 g) of the blend was put into a porcelain container, and set in a tubular electric furnace having an inner volume of 2.8 L and burning under heating was performed at 750° C. for 24 h in a stream of oxygen (700 mL/min). Thereafter, the container was cooled to the room temperature and the product (32 g) was taken out. Similarly to Example 1, the measurement of X-ray diffraction and evaluation of the cell characteristics and thermal stability of the material were carried out. These results are shown in Table 3. The result of the ICP analysis proved that the composition of product was LiNi$_{0.82}$Co$_{0.07}$Al$_{0.11}$O$_2$.

TABLE 3

Evaluation of Characteristics of Cathode Electroactive Material

| Cell characteristics | Discharge capacity | 195 mAh/g |
| --- | --- | --- |
| | Coulomb efficiency at the first cycle | 86.5% |
| | Capacity retention rate | 98% |
| Properties of the electroactive material | Peak height ratio | 0.215 |
| | Δ2Θ((110)face-(018)face) | 0.560° |

Example 4

Nickel chloride hydrate (NiCl$_2$.6H$_2$O), 173.5 g (0.73 mol) and cobalt chloride hydrate (CoCl$_2$.6H$_2$O), 38.1 g (0.16 mol) were dissolved in 2000 ml of ion-exchanged water to prepare a mixed aqueous solution containing Ni and Co. Subsequently, after 71.2 g (1.78 mol) of sodium hydroxide (NaOH) was dissolved in 500 ml of ion-exchanged water, 2.97 g (0.11 mol) of aluminum foil was dissolved into this solution to prepare an aqueous sodium aluminate solution. The mixed solution containing Ni and Co compounds was neutralized with the aqueous sodium aluminate solution. The initial pH value of the mixed solution containing Ni and Co compounds was then 3.8, but pH value rose to 6.8 immediately upon addition of a portion of the aqueous sodium aluminate solution. Thereafter, the pH value reached 7.9 at 80% addition of the aqueous solution and 12.3 upon addition of the total amount. To this was added 0.1 N HCl, adjusting pH to 7.5 to complete the reaction. The resulting bluish green precipitates were filtrated, washed sufficiently, and dried. After drying, 37 g (0.5 mol) of lithium carbonate (Li$_2$CO$_3$) was added and blending under stirring was done in a ball mill for 24 h. A portion (40 g) of this blend was put into a porcelain container, set in a tubular electric furnace having an inner volume of 2.8 L, and burnt under heating at 750° C. for 24 h in a stream of oxygen (1000 ml/min). Thereafter, the container was cooled to the room temperature and the product (32 g) was taken out. Similarly to Example 1, the measurement of X-ray diffraction and evaluation of the cell characteristics and thermal stability of the cathode electroactive material were carried out. These results are summarized in Table 4. The result of the ICP analysis proved that the composition of product was $LiNi_{0.73}Co_{0.16}Al_{0.11}O_2$.

TABLE 4

Evaluation of Characteristics of Cathode Electroactive Material

| Cell characteristics | Discharge capacity | 190 mAh/g |
|---|---|---|
| | Coulomb efficiency at the first cycle | 93.2% |
| | Capacity retention rate | 99% |
| Properties of the electro-active material | Peak height ratio | 0.093 |
| | ΔΘ((110)face-(018)face) | 0.680° |

Comparative Example 1

Lithium hydroxide (24 g, 1 mol), nickel hydroxide (77.2 g, 0.833 mol), cobalt hydroxide (5.3 g, 0.057 mol) and aluminum hydroxide (8.6 g, 0.11 mol) were blended under stirring in a solid phase ball mill for 24 h. A portion (40 g) of the blend was put into a porcelain container, and set in a tubular electric furnace having an inner volume of 2.8 L and burning under heating was performed at 750° C. for 24 h in a stream of oxygen (700 mL/min). The container was cooled to the room temperature and the product (32 g) was taken out. Similarly to Example 1, the measurement of X-ray diffraction and evaluation of the cell characteristics and thermal stability of the material were carried out. The results are summarized in Table 5. The lithium-containing complex metal oxide prepared according to the present Comparative Example had, among the cell characteristics, particularly low Coulomb efficiency at the first cycle and poor thermal stability (as evaluated by the peak height ratio). Also, the result of the ICP analysis proved that the composition of product was $LiNi_{0.833}Co_{0.057}Al_{0.11}O_2$.

TABLE 5

Evaluation of Characteristics of Cathode Electroactive Material

| Cell characteristics | Discharge capacity | 187 mAh/g |
|---|---|---|
| | Coulomb efficiency at the first cycle | 83.5% |
| | Capacity retention rate | 98% |
| Properties of the electro-active material | Peak height ratio | 0.390 |
| | ΔΘ((110)face-(018)face) | 0.500° |

Comparative Example 2

Ion-exchanged water (300 g) was added to nickel hydroxide (77.2 g, 0.833 mol) and aluminum hydroxide (13.0 g, 0.167 mol), and it was blended under stirring in a ball mill for 24 h. The blended solids in slurry were filtered and dried. Subsequently, lithium hydroxide (24 g, 1 mol) was added and it was further blended under stirring in the ball mill for 24 h. A portion (40 g) of the blend was put into a porcelain container, and set in a tubular electric furnace having an inner volume of 2.8 L and burning under heating was performed at 750° C. for 24 h in a stream of oxygen (700 mL/min). The container was then cooled to the room temperature and the product (32 g) was taken out, and further subjected to the evaluations similarly to Example 1. The results are summarized in Table 6. The lithium-containing complex metal oxide prepared according to the present Comparative Example had a low discharge capacity as well as low Coulomb efficiency at the first cycle. Also, the result of the ICP analysis proved that the composition of product was $LiNi_{0.833}Al_{0.167}O_2$.

TABLE 6

Evaluation of Characteristics of Cathode Electroactive Material

| Cell characteristics | Discharge capacity | 148 mAh/g |
|---|---|---|
| | Coulomb efficiency at the first cycle | 80.3% |
| | Capacity retention rate | 97% |
| Properties of the electro-active material | Peak height ratio | 0.251 |
| | ΔΘ((110)face-(018)face) | 0.580° |

Comparative Example 3

Ion-exchanged water (300 g) was added to nickel hydroxide (77.2 g, 0.833 mol) and cobalt hydroxide (15.5 g, 0.167 mol), and it was blended under stirring in a ball mill for 24 h. The blended solids in slurry were filtered and dried. Subsequently, lithium hydroxide (24 g, 1 mol) was added and it was further blended under stirring in the ball mill for 24 h. A portion (40 g) of the blend was put into a porcelain container, and set in a tubular electric furnace having an inner volume of 2.8 L and burning under heating was performed at 750° C. for 24 h in a stream of oxygen (700 mL/min). The container was cooled to the room temperature and the product (32 g) was taken out, and further subjected to the evaluations similarly to Example 1. The results are summarized in Table 7. The lithium-containing complex metal oxide prepared according to the present Comparative Example had particularly poor thermal stability. Also, the result of the ICP analysis proved that the composition of product was $LiNi_{0.833}Co_{0.167}O_2$.

TABLE 7

Evaluation of Characteristics of Cathode Electroactive Material

| Cell characteristics | Discharge capacity | 195 mAh/g |
|---|---|---|
| | Coulomb efficiency at the first cycle | 92.1% |
| | Capacity retention rate | 98% |
| Properties of the electro-active material | Peak height ratio | 0.708 |
| | ΔΘ((110)face-(018)face) | 0.440° |

Comparative Example 4

$LiNiO_2$ was synthesized from lithium hydroxide and nickel hydroxide as starting materials according to the standard method as described in Solid State Ionics, 69, p238 (1994) and was subjected to the evaluations similarly to Example 1. The results are summarized in Table 8. The cathode electroactive material of the present Comparative Example showed a low capacity retention rate when it was in use.

TABLE 8

Evaluation of Characteristics of Cathode Electroactive Material

| Cell characteristics | Discharge capacity | 226 mAh/g |
| --- | --- | --- |
| | Coulomb efficiency at the first cycle | 87.2% |
| | Capacity retention rate | 83% |
| Properties of the electro- active material | Peak height ratio | 1.151 |
| | Δ2Θ((110)face-(018)face) | 0.340° |

With respect to the cathode electroactive materials described in Examples 1–4 and Comparative Examples 1–4, their thermal stability is individually listed in Table 9. In the table, the full charge capacity means a charge capacity obtained when full charge was done at a current density of 0.7 MA/cm$^2$ and a voltage of 4.2 V. When DTA measurement was carried out in a stream of nitrogen at 10° C./min, a temperature at which the exothermic peak curve rose was designated as the start temperature and a temperature at the peak of the curve as the peak temperature.

TABLE 9

Thermal Stability of Cathode Electroactive Materials

| Sample | Full-charge capacity (mAh/g) | Exothermic temperatures Start temperature | Exothermic temperatures Peak temperature | Peak height ratio ($\mu$V/° C.) |
| --- | --- | --- | --- | --- |
| Example 1 | 187.1 | 230.6 | 253.3 | 0.207 |
| Example 2 | 185.6 | 232.3 | 260.7 | 0.185 |
| Example 3 | 190.3 | 228.5 | 252.8 | 0.215 |
| Example 4 | 188.6 | 216.3 | 265.4 | 0.093 |
| Comparative Example 1 | 193.4 | 220.6 | 244.4 | 0.390 |
| Comparative Example 2 | 175.8 | 224.9 | 257.3 | 0.251 |
| Comparative Example 3 | 203.9 | 212.3 | 232.6 | 0.708 |
| Comparative Example 4 | 238.7 | 208.6 | 229.0 | 1.151 |

An improvement in the thermal stability was hardly observed in the Co-substituted LiNiO$_2$ complex material of a conventional type as described in Comparative Example 3. By contrast, the thermal stability of the Co, Al-substituted LiNiO$_2$ complex metal oxides according to this invention was greatly improved by increasing the amount of the substitution by Al to be 10% or greater.

As explained above, using the lithium-containing complex metal oxides of this invention, cathode electroactive materials for lithium secondary cells with large discharge capacities, good cycle characteristics, and excellent thermal stability can be obtained.

For the first time, it has also become possible to prepare the lithium-containing complex metal oxides of this invention through the methods of the invention, which is characterized in the techniques of blending the constituent metals. Therefore, it makes the improvement of the Coulomb efficiency at the first cycle of the charge/discharge which is considered as a deficiency of Ni-based cathode electroactive materials possible.

Moreover, the methods for preparing lithium-containing complex metal oxides of this invention insure that the lithium-containing complex metal oxides can efficiently be prepared, and such oxides are usable as cathode electroactive materials for the above-mentioned lithium secondary cells.

Further, the lithium secondary cells of this invention are excellent in their cycle characteristics, discharge characteristics, and thermal stability and, in addition, their Coulomb efficiency at the first cycle of the charge/discharge is improved, because they utilize the above-mentioned lithium-containing complex metal oxides as cathode electroactive materials.

What is claimed is:

1. A method for preparing a lithium-containing complex metal oxide represented by a general formula:

$$Li_aNi_XCo_YAl_ZO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$, said method comprising the steps of:

neutralizing a mixed aqueous solution containing a Ni compound, a Co compound, and an Al compound to obtain a coprecipitation product;

washing and drying the coprecipitation product, and blending the coprecipitation product with at least one lithium compound selected from the group consisting of LiOH, Li$_2$O, and Li$_2$CO$_3$ to obtain a blend; and burning the blend in an oxygen-containing stream to obtain said lithium-containing complex metal oxide.

2. The method for preparing a lithium-containing complex metal oxide according to claim 1, wherein the step of obtaining the coprecipitation product comprises: a step of obtaining a mixed aqueous solution containing a Ni compound and a Co compound; and a step of neutralizing the mixed aqueous solution by addition of an aqueous solution of an alkali metal aluminate thereto to obtain the coprecipitation product.

3. The method for preparing a lithium-containing complex metal oxide according to claim 2, wherein the alkali metal aluminate is at least one salt selected from the group consisting of lithium aluminate, sodium aluminate, and potassium aluminate.

4. The method for preparing a lithium-containing complex metal oxide according to claim 2, wherein the Ni compound is a halide of nickel and the Co compound is a halide of cobalt.

5. The method for preparing a lithium-containing complex metal oxide according to claim 1, wherein in the burning step, an additional lithium compound is allowed to coexist in a state such that said lithium compound contacts the blend only through a gaseous phase.

6. A method for preparing a lithium-containing complex metal oxide represented by a general formula:

$$Li_aNi_XCo_YAl_ZO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$, said method comprising the steps of:

blending at least one compound selected from the group consisting of lithium hydroxide and lithium oxide, at least one compound selected from the group consisting of a nickel hydroxide and a nickel oxide, at least one compound selected from the group consisting of a cobalt hydroxide and a cobalt oxide, at least one compound selected from the group consisting of aluminum hydroxide and aluminum oxide, and a solvent to prepare slurry containing the foregoing compounds;

filtering blended solids from the slurry, drying the blended solids, and burning the blended solids in an oxygen-containing stream after filtration and drying to obtain said lithium-containing complex metal oxide.

7. The method for preparing a lithium-containing complex metal oxide according to claim 6, wherein the solvent is at least one member selected from the group consisting of an alcohol, a ketone, and an ether.

8. The method for preparing a lithium-containing complex metal oxide according to claim 6, wherein in the burning step, an additional lithium compound is allowed to coexist in a state such that said lithium compound contacts the blended solids only through a gaseous phase.

9. A method for preparing a lithium-containing complex metal oxide represented by the general formula:

$$Li_aNi_XCo_YAl_ZO_2$$

wherein $0.96 \leq a \leq 1.06$, $0.70 \leq X < 0.85$, $0.05 \leq Y \leq 0.20$, $0.10 < Z \leq 0.25$, and $0.98 \leq (X+Y+Z) \leq 1.02$,
said method comprising the steps of:

blending at least one compound selected from the group consisting of a nickel hydroxide and a nickel oxide, at least one compound selected from the group consisting of a cobalt hydroxide and a cobalt oxide, at least one compound selected from the group consisting of aluminum hydroxide and aluminum oxide, and water as solvent to prepare slurry containing the foregoing compounds;

filtering blended solids from the slurry, drying the blended solids, and dry blending the blended solids with at least one lithium compound selected from the group consisting of LiOH, $Li_2O$ and $Li_2CO_3$ to obtain a blend; and burning the blend in an oxygen-containing stream to obtain said lithium-containing complex metal oxide.

10. The method for preparing a lithium-containing complex metal oxide according to claim 9, wherein in the burning step, an additional lithium compound is allowed to coexist in a state such that said lithium compound contacts the blend only through a gaseous phase.

* * * * *